United States Patent
Myrick et al.

(10) Patent No.: US 11,586,451 B2
(45) Date of Patent: *Feb. 21, 2023

(54) RESOURCE MANAGEMENT WITH DYNAMIC RESOURCE POLICIES

(71) Applicant: Apple Inc., Cupertino, CA (US)

(72) Inventors: Andrew D. Myrick, San Francisco, CA (US); Dmitriy B. Solomonov, Sunnyvale, CA (US); Lionel D. Desai, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/201,640

(22) Filed: Mar. 15, 2021

(65) Prior Publication Data
US 2021/0311749 A1  Oct. 7, 2021

Related U.S. Application Data (63) Continuation of application No. 16/778,231, filed on Jan. 31, 2020, now Pat. No. 10,970,085, which is a
(Continued)

(51) Int. Cl.
*G06F 9/48* (2006.01)
*G06F 9/445* (2018.01)
(Continued)

(52) U.S. Cl.
CPC .......... *G06F 9/44594* (2013.01); *G06F 9/485* (2013.01); *G06F 9/5016* (2013.01);
(Continued)

(58) Field of Classification Search
None
See application file for complete search history.

(56) References Cited

U.S. PATENT DOCUMENTS 6,877,081 B2   4/2005  Herger
6,963,957 B1  11/2005  Kundu et al.
(Continued)

OTHER PUBLICATIONS

Nikolopoulos et al., "Adaptive scheduling under Memory Pressure on Multiprogrammed Clusters", 2002 IEEE, 8 pages.
(Continued)

*Primary Examiner* — Van H Nguyen
(74) *Attorney, Agent, or Firm* — Womble Bond Dickinson (US) LLP (57) ABSTRACT

A method and apparatus of a device for resource management by using a hierarchy of resource management techniques with dynamic resource policies is described. The device terminates several misbehaving application programs when available memory on the device is running low. Each of those misbehaving application programs consumes more memory space than a memory consumption limit assigned to the application program. If available memory on the device is still low after terminating those misbehaving application programs, the device further sends memory pressure notifications to all application programs. If available memory on the device is still running low after sending the memory pressure notifications, the device further terminates background, idle, and suspended application programs. The device further terminates foreground application programs when available memory on the device is still low after terminating the background, idle, and suspended application programs.

18 Claims, 9 Drawing Sheets

Related U.S. Application Data continuation of application No. 14/292,453, filed on May 30, 2014, now Pat. No. 10,552,179.

(51) Int. Cl.
  *G06F 12/02* (2006.01)
  *G06F 9/50* (2006.01)
  *G06F 11/34* (2006.01)
  *G06F 11/30* (2006.01)

(52) U.S. Cl.
  CPC ............ *G06F 12/02* (2013.01); *G06F 11/301* (2013.01); *G06F 11/3409* (2013.01)

(56) References Cited

U.S. PATENT DOCUMENTS

| | | | |
|---|---|---|---|
| 7,475,093 B2 | 1/2009 | Tomic et al. | |
| 7,581,075 B1 * | 8/2009 | Ciot | G06F 11/3419 |
| | | | 711/170 |
| 7,685,597 B1 | 3/2010 | Czajkowski et al. | |
| 7,827,358 B2 | 11/2010 | Watson et al. | |
| 8,056,081 B2 | 11/2011 | Mathur et al. | |
| 8,091,088 B2 | 1/2012 | Kishan et al. | |
| 8,544,022 B2 | 9/2013 | Arndt | |
| 8,635,630 B2 | 1/2014 | Iyer et al. | |
| 8,892,827 B2 | 11/2014 | Bernhard, III et al. | |
| 8,990,534 B2 * | 3/2015 | Desai | G09G 5/001 |
| | | | 711/158 |
| 8,997,102 B2 | 3/2015 | Pohl et al. | |
| 8,997,171 B2 | 3/2015 | Srour et al. | |
| 9,170,859 B2 | 10/2015 | Ramesh et al. | |
| 9,176,780 B2 | 11/2015 | Tuch et al. | |
| 9,690,685 B2 | 6/2017 | Vyas et al. | |
| 9,747,028 B1 * | 8/2017 | Allen | G06F 9/45558 |
| 2006/0275934 A1 | 12/2006 | Pohl et al. | |
| 2008/0168235 A1 | 7/2008 | Watson et al. | |
| 2012/0179882 A1 | 7/2012 | Bernhard, III et al. | |
| 2012/0210321 A1 | 8/2012 | Silva et al. | |
| 2013/0047198 A1 | 2/2013 | Srour et al. | |
| 2013/0054895 A1 | 2/2013 | Tuch et al. | |
| 2013/0054929 A1 | 2/2013 | Baik et al. | |
| 2013/0326166 A1 | 12/2013 | Desai et al. | |
| 2013/0332936 A1 | 12/2013 | Magee et al. | |

OTHER PUBLICATIONS

Mills et al., "Adapting to memory pressure from within scientific applications on multiprogrammed COWs", 2004 IEEE, 10 pages.

\* cited by examiner

| Application State | Memory Consumption Limit |
|---|---|
| Foreground Application | 700 MB |
| Background Media Application | 100 MB |
| Shared Screen Foreground Application | 350 MB |

RESOURCE MANAGEMENT WITH DYNAMIC RESOURCE POLICIES

This application is a continuation of co-pending U.S. patent application Ser. No. 16/778,231 filed Jan. 31, 2020, now issued as U.S. Pat. No. 10,970,085, which is a continuation of U.S. patent application Ser. No. 14/292,453, filed May 30, 2014, now issued as U.S. Pat. No. 10,552,179.

FIELD OF THE DISCLOSURE

This disclosure relates generally to operating systems and more particularly to devices for resource management.

BACKGROUND

An operating system is a collection of software that manages device hardware resources and provides common services for computer programs. The operating system is a vital component of the system software in a device. The system software manages and integrates a computer's capabilities. The system software includes the operating system, utility software, device drivers, and other software tools. Application software can be considered to be the computer software that causes a computer to perform useful tasks in response to user requests. A specific instance of application software is called a software application, application program, application or app, which are used interchangeably below. Application programs usually require an operating system to function.

As more and more services are becoming available for small or mobile devices, the number of applications running in a single device has increased significantly. Usually, a mobile device is used mostly for certain specific applications, while being equipped with general purpose computing capabilities. For example, it is common to find a mobile phone that also runs a browser application, a gaming application, and a media player application, etc. On the other hand, a mobile video player device may run a gaming application and/or an email application in addition to a video application. Multiple applications or processes in the same device compete with each other by sharing the same memory resources and computation resources embedded inside the device. The operating system performs resource/memory management to deal with resource contention in concurrent computing. Examples of resource/memory management techniques are described in U.S. Pat. No. 7,827,358, and U.S. publication numbers 2012/0179882 and 2013/0332936, all of which are incorporated herein by reference.

These applications or processes consume resources of the device, such as central processing units (CPUs), memory, input/output, etc. When two or more applications are running at the same time, the competition for the resources of the device can result in user interface glitches, the device feeling sluggish, slow response to touches or other inputs, and/or the device locking up if there are insufficient resources available to be applied to the applications. Typically, when two or more applications or processes are launched, a fixed portion of the device's resources may be applied to each of the applications or processes so that each application or process cannot consume more than the assigned fixed portion of the device's resources during execution. Such a mechanism may not be sufficiently flexible under certain circumstances. For example, an application such as photo editing software may temporarily require a large amount of memory to edit a photo or an album. If such a large amount of memory exceeds the ordinary memory usage associated with the application, the application may not be able to acquire it, even though the memory resources are widely available in a data processing system.

SUMMARY OF THE DESCRIPTION

A method and apparatus of a device for resource management by using a hierarchy of resource management techniques with dynamic resource policies is described. The hierarchy can be implemented as a sequence of operations over time. In an exemplary embodiment of such a sequence, the device determines whether available memory on the device is running low. When available memory on the device is running low, the device can terminate one or more misbehaving application programs. Each of those misbehaving application programs consumes more memory space than a memory consumption limit assigned to the application program. In one embodiment, each of the one or more misbehaving applications will receive a memory pressure notification before being terminated, and the memory consumption limit (for any state) is a value that is predetermined and published to and therefore known by application developers before they release their application software to users of the application software. When available memory on the device is still running low after terminating those misbehaving application programs, the device further sends memory pressure notifications to all application programs. The notified applications may preemptively free up certain memory in application specific manners. When available memory on the device is still running low after sending the memory pressure notifications, the device further terminates background, idle, and suspended application programs. When available memory on the device is still running low after terminating the background, idle, and suspended application programs, the device further terminates foreground application programs. In one embodiment, the foreground application programs are terminated according to a sorted sequence, in which a foreground application program that consumes the largest amount of memory space is terminated first (before terminating any other foreground applications). In one embodiment, the available memory on the device is running low when a ratio of available memory to total memory on the device is below a threshold.

In one embodiment, the memory consumption limit for an application program is determined based on a state associated with the application program. In one embodiment, states that may be associated with the application programs include foreground application, background media application, and shared screen foreground application. When an application program transitions from a first state to a second state with a reduced memory consumption limit, the device of one embodiment determines whether the application program consumes more than the pre-determined percentage of the reduced memory consumption limit of the second state. In one embodiment, the first state can be a foreground state and the second state can be a background state that has a lower memory consumption limit than the first state (the foreground state). The device further sends a memory pressure notification (after the transition to the second state) to the application program if the application program consumes more than the pre-determined percentage of the reduced memory consumption limit of the second state. The device waits a time period after sending the memory pressure notification. The device further changes the memory consumption limit for the application program to the reduced memory consumption limit of the second state after waiting the time period.

Examples of memory pressure notifications are described in U.S. Pat. No. 7,827,358 and U.S. published application numbers 2012/0179882 and 2013/0332936, all of which are hereby incorporated by reference herein. In one embodiment, a device can use a hierarchy of memory management techniques in conjunction with the forced termination of the foreground application that uses more memory than any other application that is also in the foreground state. The hierarchy of memory management techniques can be applied to attempt to reduce memory pressure (when available memory becomes low) before resorting to the forced termination of the foreground application that uses more memory than any other application that is also in the foreground state. The hierarchy of techniques can include one or more of the following operations: (1) sending memory pressure notifications that request desired levels of memory usage reduction; (2) purging available volatile memory (e.g., DRAM or other main memory for executables) that is marked as purgeable by the executing or suspended applications; (3) freeze drying applications which can include paging out memory pages (in either uncompressed or compressed states) from volatile memory to non-volatile memory (such as NAND flash memory); and (4) forced termination of suspended applications and optionally background applications that are not suspended.

Other methods and apparatuses are also described. Non-transitory machine readable storage media containing executable computer program which when executed cause a data processing system to perform one or more of the methods of this disclosure are also described.

BRIEF DESCRIPTION OF THE DRAWINGS

The disclosure is illustrated by way of example and not limitation in the figures of the accompanying drawings in which like references indicate similar elements.

DETAILED DESCRIPTION

A method and apparatus of a device that performs resource management by using a hierarchy of resource management techniques with dynamic resource policies is described. In the following description, numerous specific details are set forth to provide thorough explanation of embodiments of the disclosure. It will be apparent, however, to one skilled in the art, that embodiments of the disclosure may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the disclosure. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs resource management by using a hierarchy of resource management techniques with dynamic resource policies is described. In one embodiment, the device applies a dynamic solution to resource management that takes advantage of different memory management techniques that can be useful when two or more applications are in the foreground state. When available physical memory is low (e.g., the ratio of available physical memory pages to total physical memory pages falls below a pre-determined threshold), the device of one embodiment kills all the applications that are consuming more memory space than the memory consumption limit assigned to the application. After that, if the available physical memory is still low, the device sends memory pressure notifications to all applications. The notified applications may preemptively free up certain memory in application specific manners. If the available physical memory is still low after sending the memory pressure notifications, the device jettisons background, idle, and suspended applications. Finally, if the available physical memory is still low after all previous operations, the device jettisons active foreground applications by killing the foreground application consuming the most memory first.

In one embodiment, when an application transitions between different states (e.g., foreground application, background media application, shared screen foreground application, etc.), the memory consumption limit for the application changes but the enforcement of the change is delayed. For example and in one embodiment, the memory consumption limit for a foreground application is 700 MB, the memory consumption limit for a background media application is 100 MB, and the memory consumption limit for a shared screen foreground application is 350 MB. When an application transitions from an old state to a new state with a reduced memory consumption limit, if the memory footprint of the application is greater than a pre-determined percentage (e.g., 80%) of the memory consumption limit of the new state, the device of one embodiment sends a memory pressure notification to the application. The device then waits for a period of time (e.g., 5 seconds) before reducing the memory consumption limit of the application to memory consumption limit of the new state. After the period of time, the new memory consumption limit is enforced.

Figure 1:
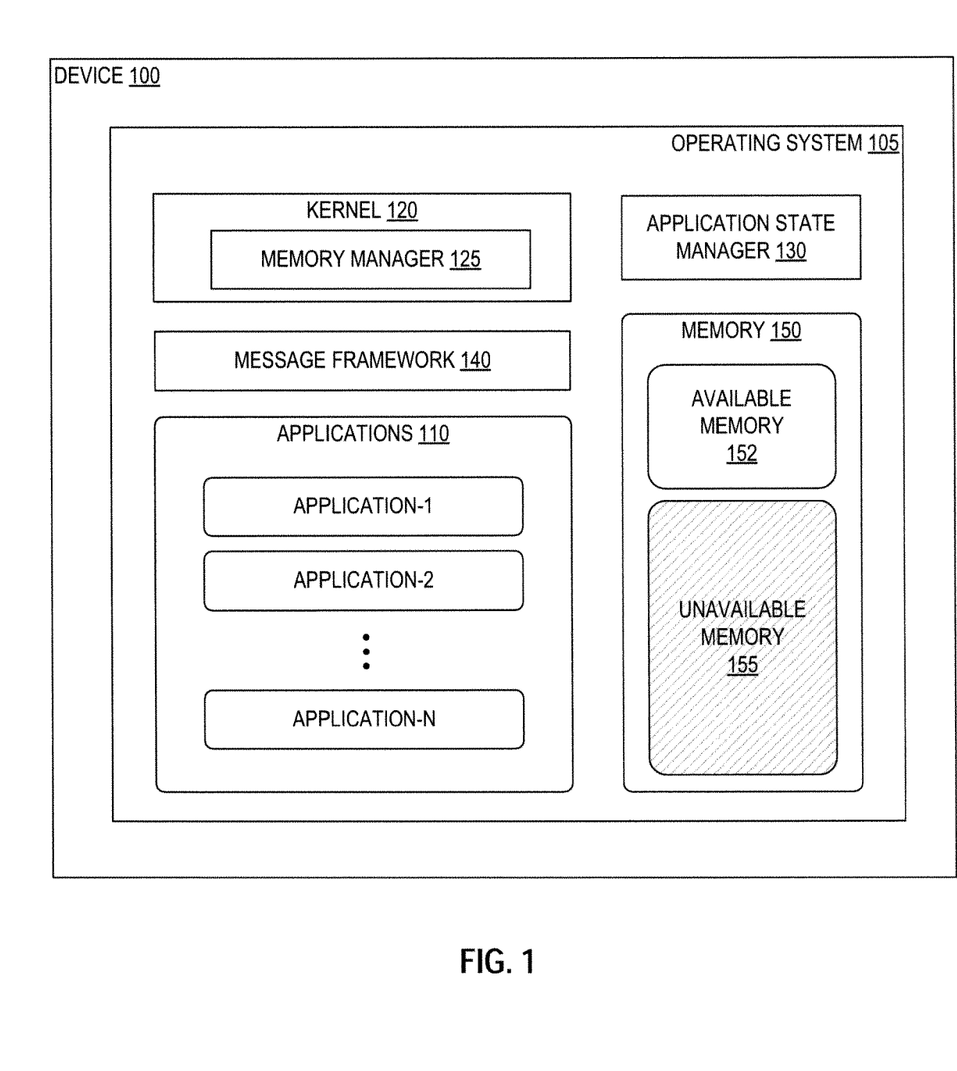
FIG. 1 is a block diagram of one embodiment of a device that performs resource management.

FIG. 1 is a block diagram of one embodiment of a device 100 that performs resource management. In one embodiment, the device 100 can be a desktop computer, server, smartphone, laptop, personal digital assistant, music playing device, gaming device, or any other device that can execute multiple processes. In FIG. 1, device 100 includes an operating system 105 that is a set of software used to manage device hardware resources and provides common services for other running computer programs, such as application programs. The operating system 105 includes a kernel 120, an application state manager 130, and a message framework 140. The operating system 105 manages several applications 110 and physical memory 150.

In one embodiment, the operating system 105 manages several running applications 110 by scheduling a processor of the device 100 to execute each of the running applications. As illustrated in FIG. 1, the applications 110 include several applications 1-N. In one embodiment, the operating system 105 manages the physical memory 150 by keeping track of the status of each memory location, either unavailable or free. The operating system 105 determines how memory is allocated among competing processes, deciding who gets memory, when they receive it, and how much they are allowed. When memory is allocated, the operating system 105 determines which memory locations will be assigned. It tracks when memory is freed or unallocated and updates the status. As illustrated in FIG. 1, the physical memory 150 includes available physical memory 152 and unavailable physical memory 155.

In one embodiment, an application is a process that is an instance of an application program that is being executed. In this embodiment, the application may be an application program that is executing as a result of user input. In another embodiment, an application is a thread that is the smallest sequence of programmed instructions that can be managed independently by an operating system scheduler. In one embodiment, a thread is contained inside a process. Multiple threads can exist within the same process and share resources such as memory, while different processes do not share these resources.

The kernel 120 includes a memory manager 125 to coordinate memory allocation for running applications, such as applications 110, based on limited available physical memory in device 100. Memory manager 125 may monitor an overall status of memory usage of the device 100, e.g., periodically, continuously or on demand. In one embodiment, memory manager 125 can update memory usage status with a current status of memory usage for device 100, e.g. based on a level of physical memory consumption, a ratio derived from sizes of available and used physical memory, or other applicable values. Memory manager 125 may directly perform memory allocation/de-allocation operations at kernel level and/or ask selected applications to perform application specific memory management operations at user level. Thus, memory manager 125 can work cooperatively with applications 110 to maintain stability of memory usage within device 100, e.g., keeping relevant values in memory usage status within a preconfigured range.

In FIG. 1, and in one embodiment, the kernel 120 handles the management of physical memory 150 and manages the state of the applications 110. In another embodiment, the kernel 120 handles memory management using the memory manager 125, and the application state manager 130 handles the state of the applications 110. In one embodiment, the application state manager 130 determines a state in which the application is in (e.g., foreground application, background media application, shared screen foreground application, etc.), and sends the state information to the memory manager 125. In one embodiment, the memory manager 125 performs memory management by using a hierarchy of resource management techniques with dynamic resource policies. In one embodiment, the hierarchy of resource management techniques represents a sequence or a priority of applying different resource management techniques, which may include jetsam of applications, virtual memory compression, purging memory, and memory warnings at specific thresholds.

Freezing is application swapping or page out, i.e. memory pages belonging to a particular application are chosen and elected to be moved to a non-volatile memory or a compressed virtual memory (VM). In one embodiment, frozen pages can be moved to an uncompressed, fixed-size file on non-volatile NAND flash memory. The compressed VM can be a compressed region within main volatile memory. The compressed VM compresses the data of pages fed to it and keeps that compressed data in main volatile memory for easy decompression when needed. In one embodiment, the memory manager 125 can ensure that the application's data is sent out in homogenous compressed segments, i.e., the memory manager 125 can make sure that there is no mingle of compressed data between different applications.

Purgeable memory is a region of memory that, when marked as unneeded by a process, can be reclaimed quickly and efficiently by the operating system 105. An efficient way to free memory rapidly without killing an application is to purge some purgeable memory. For example and in one embodiment, if an application is nearing 80% of its assigned memory consumption limit, its volatile purgeable memory is reclaimed. If after reclaiming its purgeable memory, the application is still above 80% of the memory consumption limit, a memory pressure notification is then sent to the application to reduce its footprint. In this manner, an application using purgeable memory is not penalized.

In one embodiment, the priorities used to jetsam applications (e.g., the sequence in jetsam applications described in FIG. 4 below) can be applied to reclaim purgeable memory. When the memory manager 125 tries to reclaim memory on the system, it can purge memory from applications in jetsam priority order. This will ensure that foreground applications have a better chance of keeping their cached state because foreground applications are usually the last application to be terminated.

In one embodiment, purgeable footprint accounting can be revamped in the following ways: (1) volatile memory is not included in an application's footprint; (2) the entire virtual size of a non-volatile purgeable memory region will count against an application's footprint; and (3) the resident size of a non-volatile purgeable memory region will count against an application's footprint. This accounting can be more honest for foreground applications that make heavy use of purgeable memory so that they are not penalized for regions that they have already returned to the system.

In one embodiment, the memory manager 125 intelligently selects applications for page out to NAND non-volatile memory. The memory manager 125 of one embodiment hides the page out latency and uses the page out budget effectively. The memory manager 125 identifies the ideal candidate applications for page out to NAND non-volatile memory, i.e., applications the user is likely to use again. The memory manager 125 performs page out early enough to avoid severe memory pressure. In one embodiment, once an application's data has been swapped to NAND non-volatile memory, the memory manager 125 has reclaimed all the memory it could at that point. If the memory manager 125 jetsam that application later on, the operating system 105 has not only gained zero additional free pages from the swapped image but it has also wasted NAND cycles. Therefore, in one embodiment, the memory manager 125 enhances the jetsam of application to be aware of page out operations.

Applications 110 and memory manager 125 may listen to messages routed by message framework 140, e.g., the Grand Central Dispatch (GCD), to communicate with each other asynchronously. In one embodiment, kernel 120 may detect system-wide memory pressure and alert user space processes such as applications 110. Message framework 140 may asynchronously alerts clients, such as applications 110, of kernel events caused by changes in memory usage status.

Figure 2:
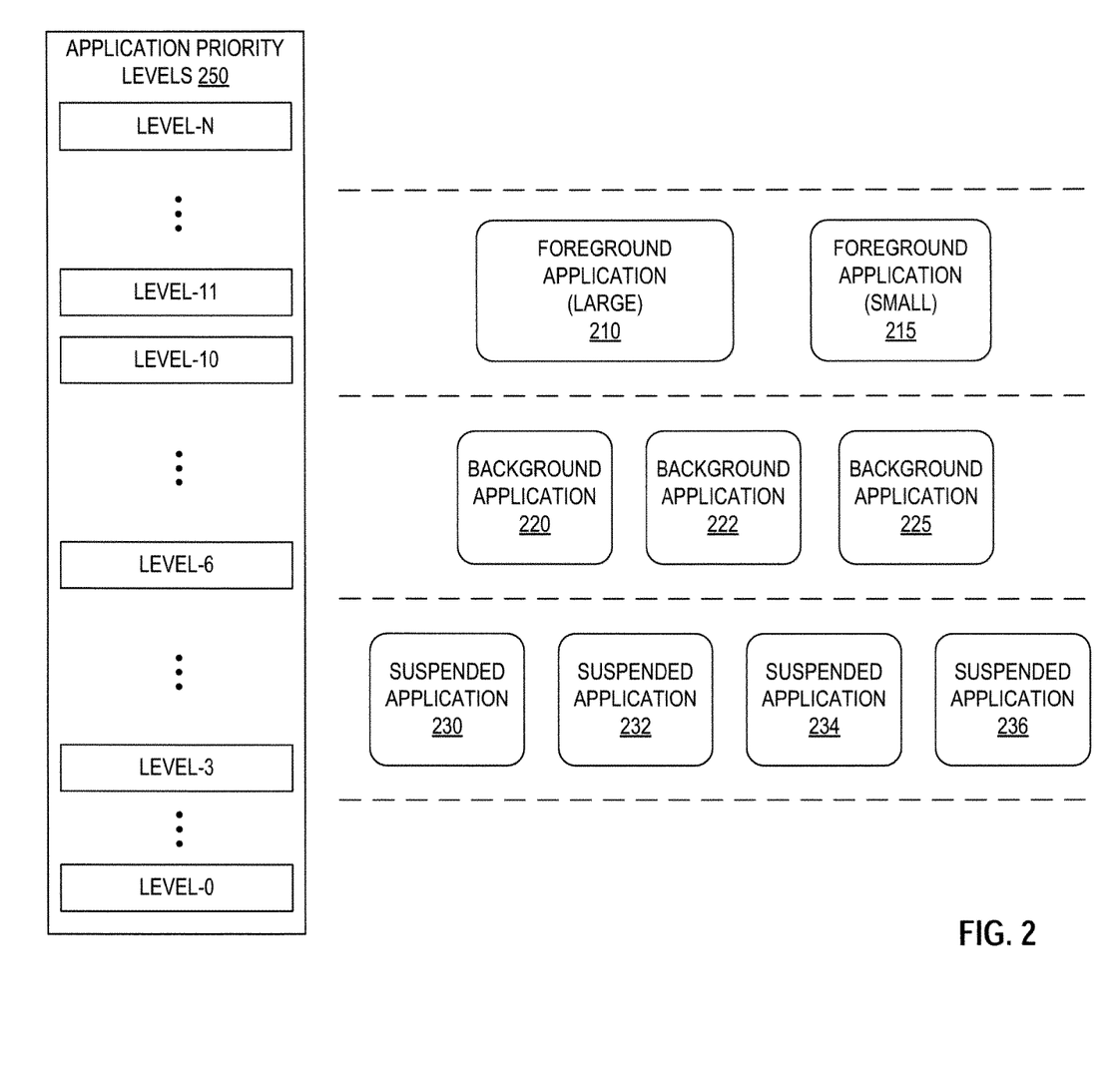
FIG. 2 illustrates an example of several applications being executed on a device at a particular moment of time.

FIG. 2 illustrates an example of several applications being executed on a device at a particular moment of time. In one embodiment, the applications shown in this figure are the applications 110 described in FIG. 1 above. Each application can be either a process or a thread. As illustrated in FIG. 2, there are foreground applications 210 and 215, background applications 220-225, and suspended applications 230-236 that are being executed on the device. In one embodiment, the foreground application 210 consumes more memory resources than the foreground application 215. FIG. 2 also shows a list of application priority levels 250 that are associated with the applications.

A foreground application, in one embodiment, is an application that is interacting with a user. A background application, in one embodiment, is an application that is not interacting with the user. Examples of background applications may include audio playback, location related services (e.g., GPS location services, maps, etc.), radio communications (e.g., Bluetooth, Wi-Fi, and cellular), network communications, VoIP, etc. For example and in one embodiment, an application running in the foreground on the device may be an application that is displayed on an output device of the device. In another embodiment, the background applications may be partially or fully viewable, but are not the focus of the device's user interface. A suspended application is an application that is suspended from running or inactive.

In one embodiment, some applications may have a higher or lower priority than other applications. An application priority is a property that indicates the urgency with which that application is scheduled to run (or execute) when there are many applications that need to be run. This application priority is used by the operating system to schedule when an application is to be executed and how fast the application is to be executed. In one embodiment, an application with a higher priority than other applications would consume a greater amount of the device resources (e.g., processor resources, etc.). In one embodiment, the operating system assigns high application priorities to applications having high quality of service requirements (e.g., fast service response time) and assigns low application priorities to applications having low quality of service requirements.

The list of application priority levels 250 shows several different levels of application priorities, from the lowest application priority (level-0) to the highest application priority (level-N). Applications associated with the same application priority level have the same application priority. Application priority level-0 is usually associated with an idle process/application, which only runs when there is nothing else for the device to do. Application priority level-N is usually associated with some system services. In one embodiment, suspended applications (e.g., suspended applications 230-236) have higher priorities than the idle process/application. In one embodiment, suspended applications are associated with application priority levels that are lower than application priority levels associated with background applications (e.g., background applications 220-225). In one embodiment, one suspended application can have higher priority than another suspended application. In one embodiment, one background application can have higher priority than another background application. In one embodiment, background applications have lower priorities than foreground applications (e.g., foreground applications 210 and 215). In one embodiment, one foreground application can have higher priority than another foreground application.

Figure 3A:
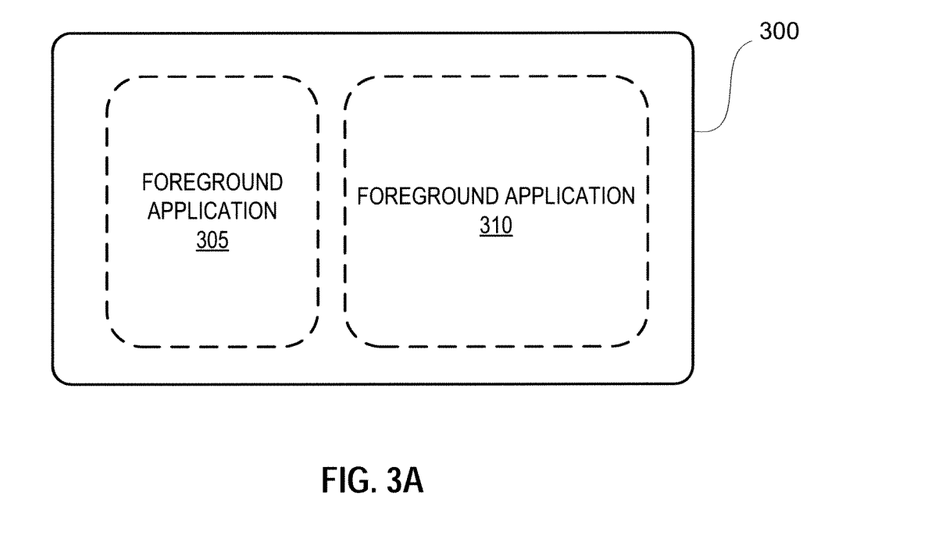
FIG. 3A illustrates an example of two foreground applications sharing the same screen.

FIG. 3A illustrates an example of two foreground applications sharing the same screen. Specifically, this figure shows a display screen 300 that displays two foreground applications 305 and 310. Each application can be either a process or a thread. For example, Safari, a browser application from Apple Inc. of Cupertino, Calif., launches one process for each tab. Therefore, a user can have two Safari tabs on screen which are two different processes. Thus two foreground applications share the same screen. In one embodiment, the foreground application 310 consumes more memory resources than the foreground application 305.

Figure 3B:
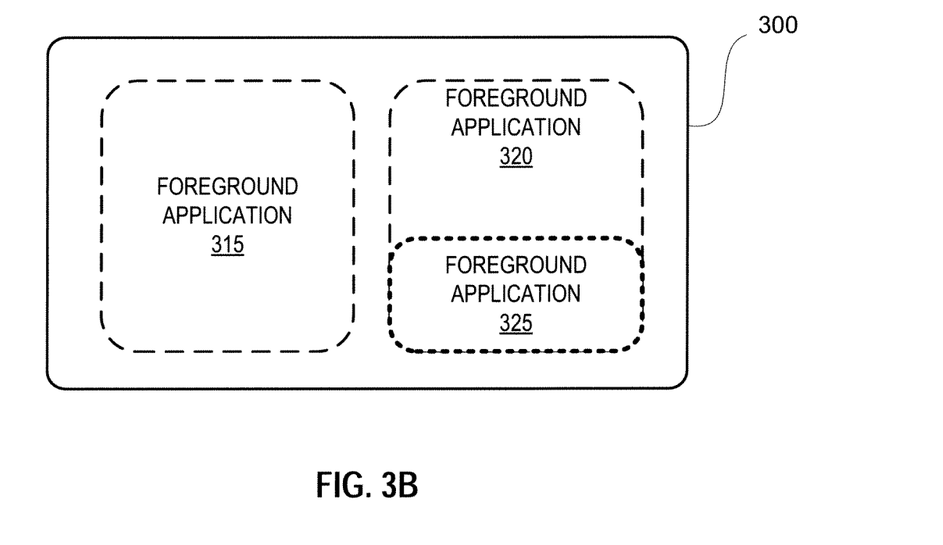
FIG. 3B illustrates an example of three foreground applications sharing the same screen.

FIG. 3B illustrates an example of three foreground applications sharing the same screen. Specifically, this figure shows a display screen 300 that displays three foreground applications 315, 320, and 325. As illustrated, the foreground application 325 is displayed as a small window on the primary window for foreground application 320. For example and in one embodiment, the foreground application 325 is displayed as an overlaid video window that overlays the window displayed for foreground application 320.

Figure 4:
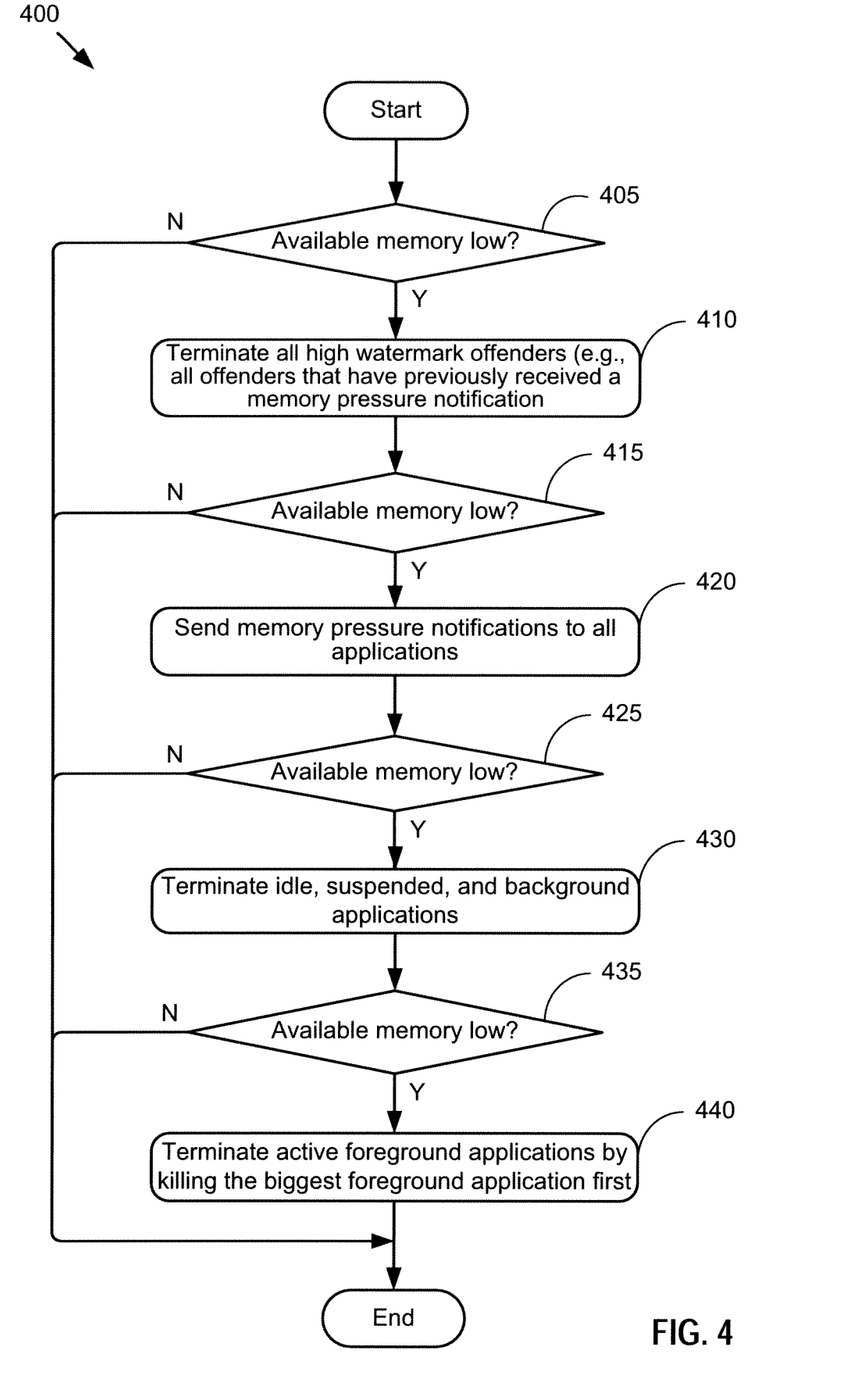
FIG. 4 illustrates a flowchart of one embodiment of a process to perform memory management on a device by using a hierarchy of resource management techniques.

FIG. 4 illustrates a flowchart of one embodiment of a process 400 to perform memory management on a device by using a hierarchy of resource management techniques. In one embodiment, the hierarchy of resource management techniques represents a sequence or a priority of applying different resource management techniques. In one embodiment, the memory manager 125 described in FIG. 1 above executes process 400 to perform memory management.

In FIG. 4, process 400 begins by determining (at block 405) whether the available physical memory on the device is low. In one embodiment, the ratio of available physical memory to total physical memory on the device is used to determine whether the available physical memory is low. In one embodiment, when the ratio of available physical memory to total physical memory is below a threshold, the available physical memory on the device is considered to be low. In one embodiment, the ratio of available physical memory to total physical memory is calculated using sizes of available physical memory 152 and physical memory 150 described in FIG. 1 above. In one embodiment, the sizes of available physical memory 152 and physical memory 150 are represented by the number of available physical memory pages and the total physical memory pages on the device.

If it is determined (at block 405) that the available physical memory is low, process 400 terminates (at block 410) all high watermark offenders, which are applications that are consuming more than a memory consumption limit (e.g., 700 MB) assigned to the application. Each application can be either a process or a thread. In one embodiment, those high watermark offenders have received notifications (e.g., memory pressure notifications) regarding the likelihood of crossing the high watermark previously (e.g., when reaching 80% of the memory consumption limit) and have had opportunities to alleviate the problem. Therefore, the killing of those high watermark offenders that cannot alleviate the problem by themselves is justified. If it is determined (at block 405) that the available physical memory is not low, process 400 terminates.

At block 415, process 400 determines whether the available physical memory on the device is low. In one embodiment, the operations performed at block 415 are the same as operations performed at block 405 described above. If the available physical memory is low, process 400 sends (at block 420) memory pressure notifications to all applications. The notified applications may preemptively free up certain memory in application specific manners not available to the kernel. In one embodiment, the memory pressure notifications are sent through the message framework 140 described in FIG. 1 above.

For example, when receiving a memory pressure notification, Safari, a browser application from Apple Inc. of Cupertino, Calif., which has cached a large amount of images, can opt to release a portion of the cached images voluntarily with Safari specific memory management operations rather than wait for a system-wide memory collection (e.g., via a page-out operation) to start paging out used memory. System-wide memory collection may result in forcing Safari to surrender used memory space containing critical data for Safari. It may be beneficial from Safari's perspective to voluntarily release used memory in a Safari specific manner as it is aware of the memory it is using and can free up memory with the smallest performance hit. Additionally, Safari (or other applications) specific memory management operations may have the advantage of releasing bigger chunks of memory compared with smaller pieces (e.g., a single page of 4K bytes) typically released from system-wide memory management operations (e.g., via a kernel). If it is determined (at block 415) that the available physical memory is not running low, process 400 terminates.

At block 425, process 400 determines whether the available physical memory on the device is low. In one embodiment, the operations performed at block 425 are the same as operations performed at block 405 described above. If the available physical memory is low, process 400 terminates (at block 430) idle, suspended, and background applications. In one embodiment, the termination of idle, suspended, and background applications is performed according to a sequence in which the application with the lowest priority is killed first.

In one embodiment, the available physical memory is checked again after one or more applications are killed by operations of block 430. If the available physical memory is no longer running low, process 400 ends. Otherwise, the operations of block 430 continue until there are no more idle, suspended, or background applications to kill. In one embodiment, the application state manager 130 described in FIG. 1 above informs process 400 as to whether an application is an idle, suspended, or background application. If it is determined (at block 425) that the available physical memory is not running low, process 400 terminates.

At block 435, process 400 determines whether the available physical memory on the device is low. In one embodiment, the operations performed at block 435 are the same as the operations performed at block 405 described above. If the available physical memory is low, process 400 terminates (at block 440) active foreground applications. In one embodiment, the termination of active foreground applications is according to a sorted sequence in which the foreground application that is using the most amount of memory space is killed first. In one embodiment, the available physical memory is checked again after one or more foreground applications are killed by operations of block 440. If the available physical memory is no longer running low, process 400 ends. Otherwise the operations of block 440 continue until there are no more foreground applications to kill. In one embodiment, the application state manager 130 described in FIG. 1 above informs process 400 whether an application is a foreground application. Process 400 then ends.

One of ordinary skill in the art will recognize that process 400 is a conceptual representation of the operations used to perform resource management. The specific operations of process 400 may not be performed in the exact order shown and described. The specific operations may not be performed in one continuous series of operations, and different specific operations may be performed in different embodiments. Furthermore, process 400 could be implemented using several sub-processes, or as part of a larger macro process.

Figure 5:
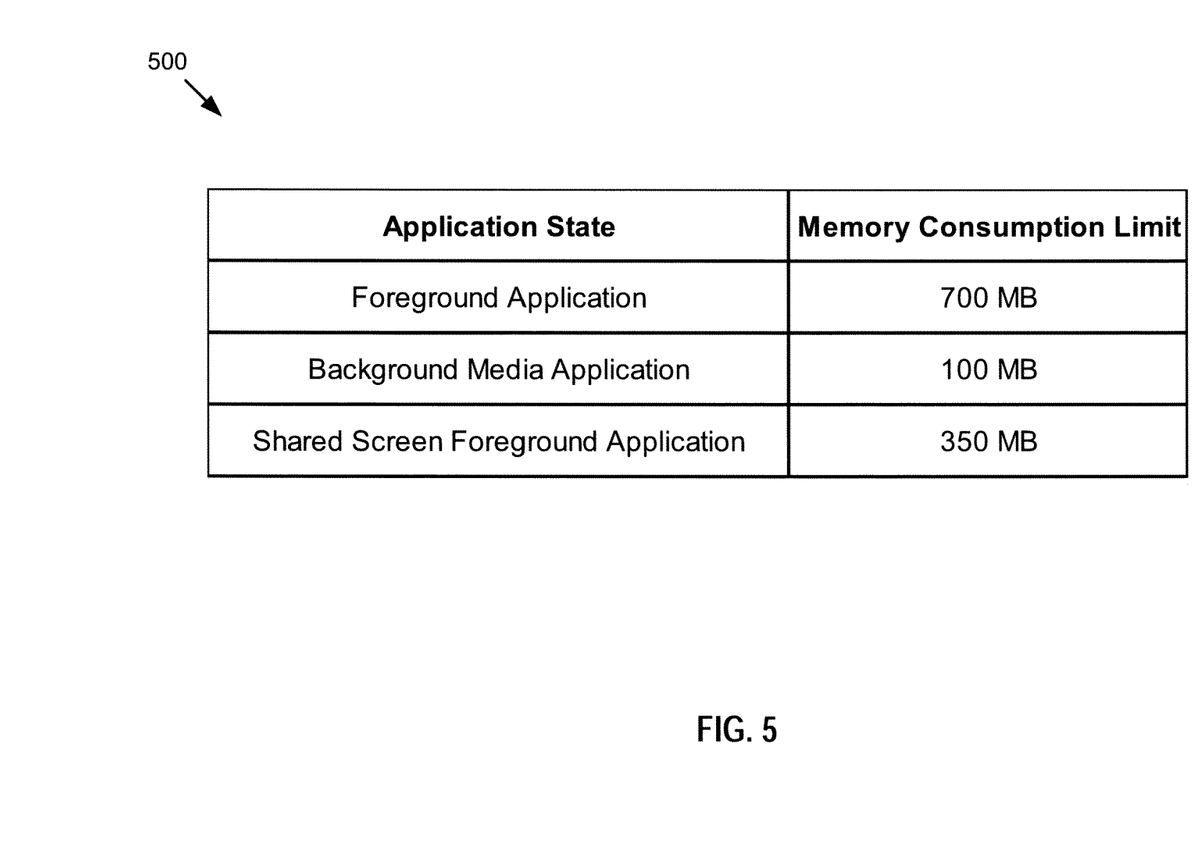
FIG. 5 illustrates an example of different memory consumption limits assigned to applications at different application states.

In order to determine which application is a high watermark offender, the memory space consumed by each application needs to be compared with a memory consumption limit assigned to the application to see if the application has crossed the memory consumption limit. In one embodiment, the memory consumption limit assigned to each application changes when the state of the application changes. In one embodiment, applications at the same state have the same memory consumption limit. FIG. 5 illustrates an example of different memory consumption limits assigned to applications at different application states. Specifically, this figure shows a table 500 that defines a memory consumption limit for each application state. In one embodiment, the application state manager 130 described above in FIG. 1 handles and monitors the state of each application. In one embodiment, an application can be either a process or a thread. The memory consumption limit can be assigned to each process. For example, Safari, a browser application from Apple Inc. of Cupertino, Calif., launches one process for each tab and each process for a tab of Safari can be assigned a memory consumption limit that is corresponding to the state of the process. Each application in one embodiment can be one or more processes and each such process can include the execution of one or more threads.

In one embodiment, when an application is a foreground application that does not share the screen with other applications, the memory consumption limit assigned to the application is 700 MB. Therefore, the application may be deemed a high watermark offender when it consumes more than 700 MB of physical memory space. In one embodiment, when an application is a background media application, the memory consumption limit assigned to the application is 100 MB. Therefore, the application may be deemed a high watermark offender when it consumes more than 100 MB of physical memory space. In one embodiment, when an application is a shared screen foreground application, the memory consumption limit assigned to the application is 350 MB. Therefore, the application may be deemed a high watermark offender when it consumes more than 350 MB of physical memory space.

In one embodiment, the table 500 that includes memory consumption limits for different application states are published to application developers. One of ordinary skill in the art will recognize that there can be more application states in addition to the applications states described above. One of ordinary skill in the art will also recognize that the memory consumption limit assigned to each application state may be different from the numbers described above and the memory consumption limit can be changed dynamically instead of being a fixed number.

Figure 6:
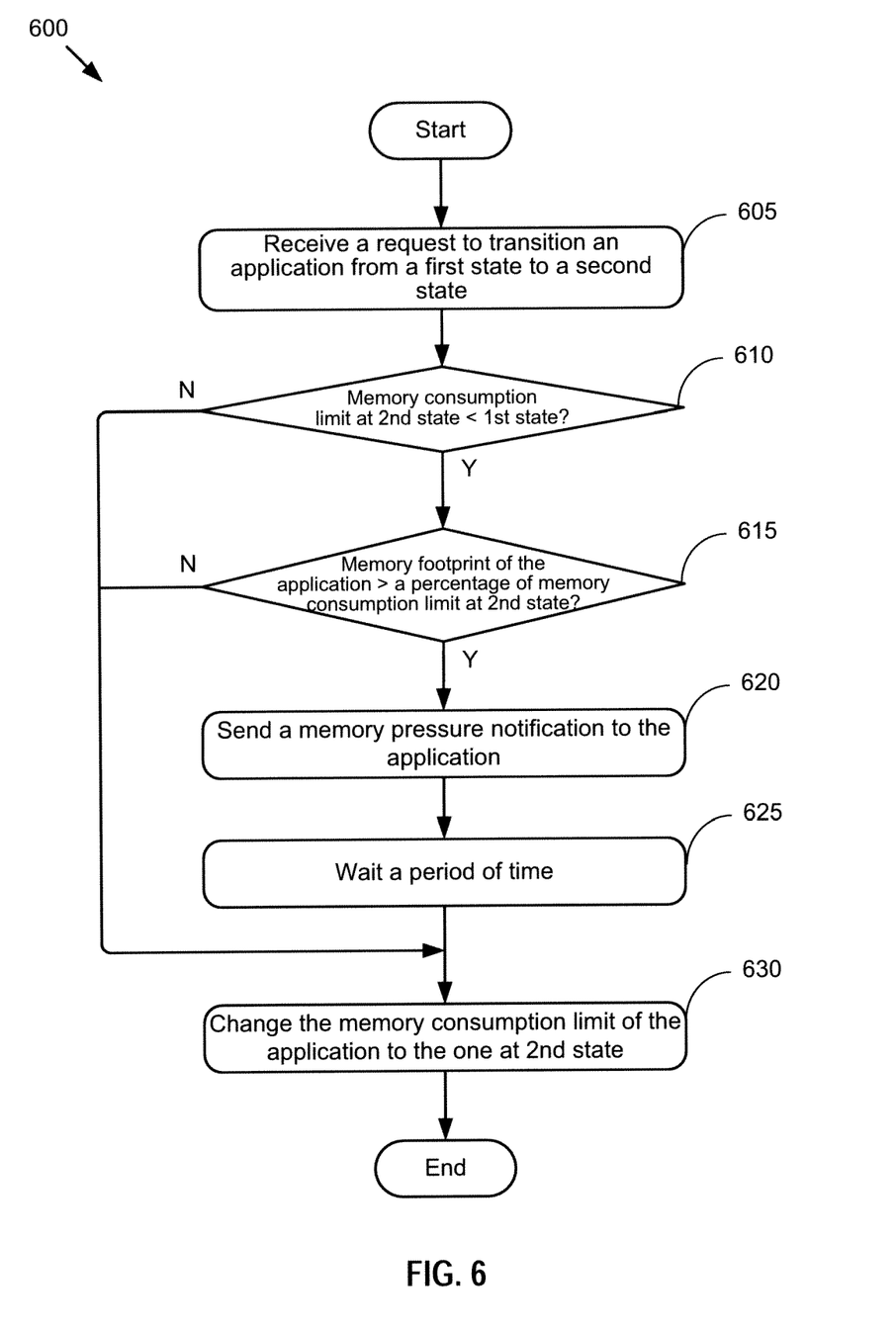
FIG. 6 illustrates a flowchart of one embodiment of a process to handle the transition of an application from one state to another state with reduced memory consumption limit.

When an application transitions from one state to another state that has a smaller memory consumption limit, the application is likely to get terminated by process 400 described in FIG. 4 above because the application is likely to become a high watermark offender. FIG. 6 illustrates a flowchart of one embodiment of a process 600 to handle the transition of an application from one state to another state with reduced memory consumption limit. The application can be either a process or a thread. In one embodiment, the memory manager 125 described in FIG. 1 above executes process 600 to deal with the transition of an application from one state to another state with reduced memory consumption limit.

In FIG. 6, process 600 begins by receiving (at block 605) a request to transition an application from a first state to a second state. In one embodiment, process 600 receives the request from the application state manager 130 described in FIG. 1 above. In one embodiment, the request is received through the message framework 140 described in FIG. 1 above.

At block 610, process 600 determines whether the memory consumption limit for the second state is smaller than the memory consumption limit for the first state. In one embodiment, the memory consumption limit for each state is defined in a table as described in FIG. 5 above. If the memory consumption limit of the second state is bigger than the memory consumption limit of the first state, process 600 proceeds to block 630. If the memory consumption limit of the second state is smaller than the memory consumption limit of the first state, process 600 determines (at block 615) whether the application that is currently at the first state is consuming a high percentage (e.g., more than 80%) of the memory consumption limit for the second state.

If the application is not consuming a high percentage of the memory consumption limit for the second state, process 600 proceeds to block 630. If the application is consuming a high percentage of the memory consumption limit for the second state, process 600 sends (at block 620) a memory pressure notification to the application. In one embodiment, after receiving the notification, the application may preemptively free up certain memory in application specific manners not available to the kernel. In one embodiment, the memory pressure notification is sent through the message framework 140 described in FIG. 1 above.

At block 625, process 600 waits a period of time. For example and in one embodiment, the waiting period lasts 5 seconds. The purpose of this waiting period is to give the application enough time to preemptively free up enough memory space so that it no longer consumes a high percentage of the memory consumption limit for the second state.

At block 630, process 600 changes the memory consumption limit associated with the application from the memory consumption limit for the first state to the memory consumption limit for the second state. Process 600 then ends.

In one embodiment, after process 600 ends, the operations described in FIG. 4 above are applicable based on the new memory consumption limit.

One of ordinary skill in the art will recognize that process 600 is a conceptual representation of the operations used to perform memory management. The specific operations of process 600 may not be performed in the exact order shown and described. The specific operations may not be performed in one continuous series of operations, and different specific operations may be performed in different embodiments. Furthermore, process 600 could be implemented using several sub-processes, or as part of a larger macro process.

Figure 7:
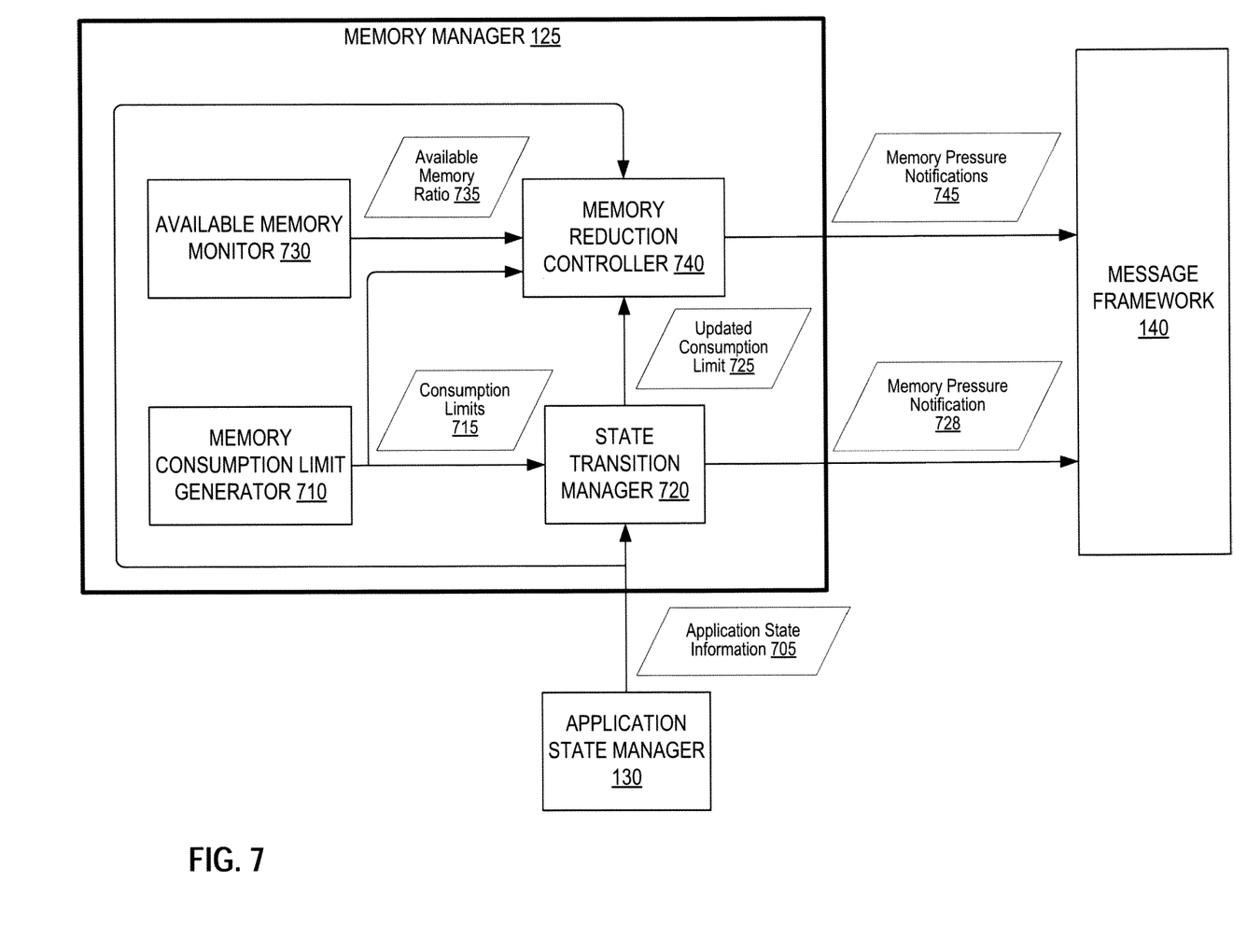
FIG. 7 illustrates a detailed diagram of the memory manager of one embodiment.

FIG. 7 illustrates a detailed diagram of the memory manager 125 of one embodiment. Specifically, this figure illustrates a set of modules for managing the memory resources for multiple applications. Each application can be either a process or a thread. In one embodiment, the memory manager 125 is used by a kernel of an operating system to facilitate memory management, such as kernel 120 of FIG. 1. As shown in FIG. 7, the memory manager 125 includes a memory consumption limit generator 710, a state transition manager 720, an available memory monitor 730, and a memory reduction controller 740.

The memory consumption limit generator 710 generates different memory consumption limits for different application states. In one embodiment, the memory consumption limit generator 710 generates the memory consumption limits by looking up a table as described in FIG. 5 above. The memory consumption limit generator 710 sends the generated memory consumption limits 715 to the state transition manager 720 and the memory reduction controller 740.

The application state manager 130 handles and monitors the state information of the applications, as described in FIG. 1 above. In one embodiment, for each application, the application state manager 130 determines a state in which the application is in (e.g., foreground application, background media application, shared screen foreground application, etc.), and sends the application state information 705 to the state transition manager 720. In one embodiment, for each application, the application state manager 130 determines whether the application is an idle application, suspended application, background application, or foreground application, and sends it as part of the application state information 705 to the memory reduction controller 740.

The state transition manager 720 adjusts memory consumption limit for an application when the application transitions from one application state to another application state. In one embodiment, the state transition manager 720 receives the application state information 705 and determines whether an application is transitioning from one application state to another application state. The state transition manager 720 then updates the memory consumption limit for the application based on the memory consumption limits 715 it received from the memory consumption limit generator 710. The state transition manager 720 then sends the updated memory consumption limit 725 to the memory reduction controller 740.

In one embodiment, the state transition manager 720 performs the operations described above in process 600 of FIG. 6. In one embodiment, when the memory consumption limit of the new state is smaller than the memory consumption limit of the old state and the memory footprint of the application is larger than a certain percentage (e.g., 80%) of the memory consumption limit for the new state, the state transition manager 720 sends a memory pressure notification 728 to the application through the message framework 140, which is described in FIG. 1 above.

The available memory monitor 730 monitors the usage of physical memory on the device to determine if the physical memory on the device is running low. In one embodiment, the available memory monitor 730 determines whether the available physical memory is low by calculating the ratio of available physical memory to total physical memory on the device. The available memory monitor 730 then sends the available memory ratio 735 to the memory reduction controller 740. In one embodiment, the available memory monitor 730 performs operations of blocks 405, 415, 425, or 435 of FIG. 4 described above.

The memory reduction controller 740 performs memory management by using a hierarchy of resource management techniques. In one embodiment, the hierarchy of resource management techniques represents a sequence or a priority of applying different resource management techniques. The memory reduction controller 740 receives the available memory ratio 735 from the available memory monitor 730 and the application state information 705 from the application state manager 130. In one embodiment, the memory reduction controller 740 performs the operations of process 400 described in FIG. 4 above. In one embodiment, the memory reduction controller 740 sends memory pressure notifications 745 to applications through the message framework 140.

The memory manager 125 was described above for one embodiment of the disclosure. One of ordinary skill in the art will realize that in other embodiments, this module can be implemented differently. For instance, in one embodiment described above, certain modules are implemented as software modules. However, in another embodiment, some or all of the modules might be implemented by hardware, which can be dedicated application specific hardware (e.g., an ASIC chip or component) or a general purpose chip (e.g., a microprocessor or FPGA).

Figure 8:
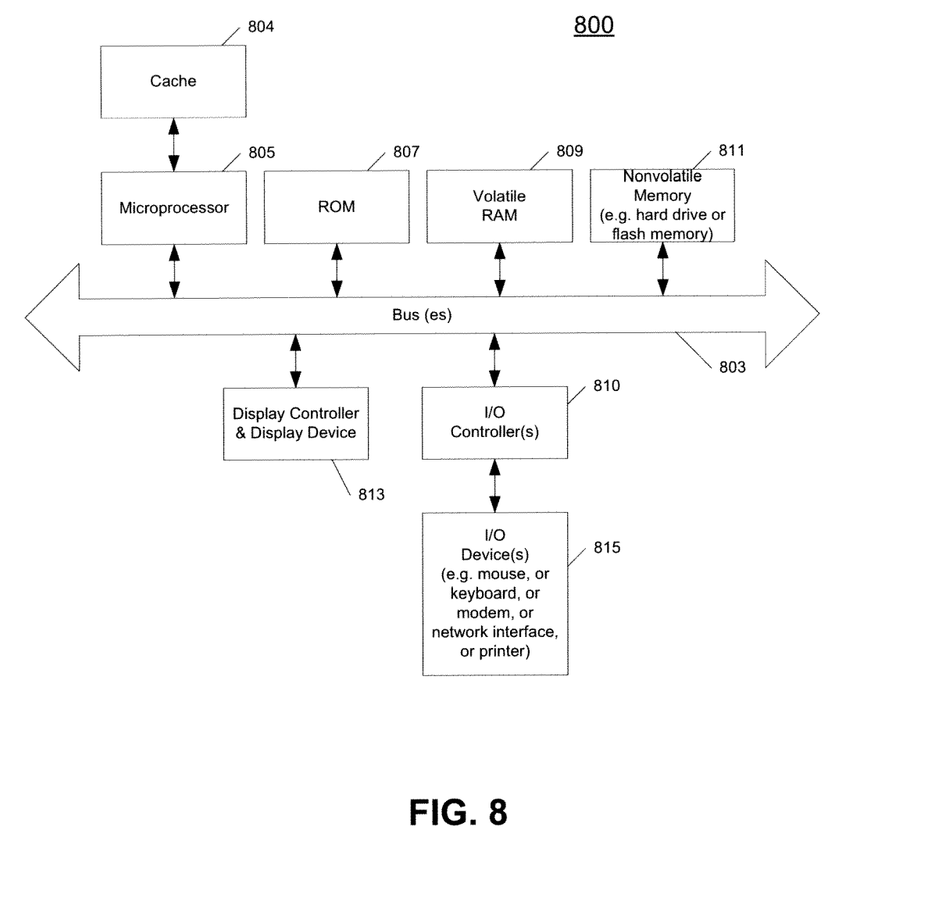
FIG. 8 shows one example of a data processing system, which may be used with one embodiment.

FIG. 8 shows one example of a data processing system 800, which may be used with one embodiment. For example, the system 800 may be implemented including a device 100 as shown in FIG. 1. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices 815 which may be mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
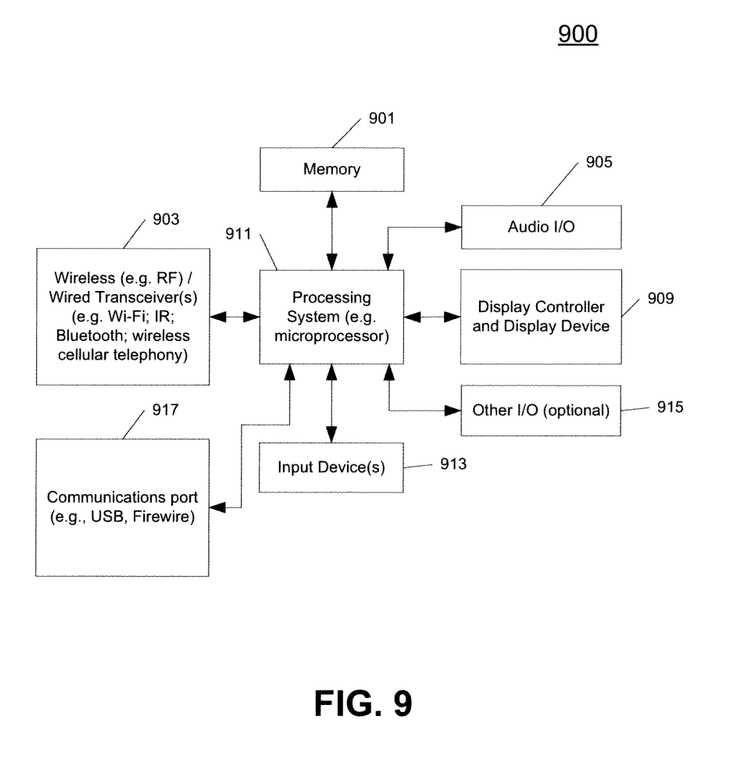
FIG. 9 shows an example of another data processing system which may be used with one embodiment.

FIG. 9 shows an example of another data processing system 900 which may be used with one embodiment. For example, system 900 may be implemented as a device 100 as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker, for example, for playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further includes one or more communication ports 917 to communicate with another data processing system, such as the system in FIG. 8. The communication port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld device or a personal digital assistant (PDA), or a cellular telephone with PDA like functionality, or a handheld device which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 9.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in U.S. Pat. Nos. 7,345,671 and 7,627,343, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

The foregoing discussion merely describes some exemplary embodiments of the disclosure. One skilled in the art will readily recognize from such discussion, the accompanying drawings and the claims that various modifications can be made without departing from the spirit and scope of the disclosure.

What is claimed is:

1. A non-transitory machine readable medium storing executable program instructions which when executed by a data processing system cause the data processing system to perform a method, the method comprising:
   transitioning a first application program from a first state to a second state, wherein the first state has a first memory consumption amount and the second state has a second memory consumption amount that is less than the first memory consumption amount;
   sending, after the transitioning, a memory pressure notification to the first application program;
   waiting a time period after sending the memory pressure notification, wherein during the time period, the second memory consumption amount is not applied to the first application program; and
   dynamically changing the first memory consumption amount of the first application program to the second memory consumption amount.

2. The medium as in claim 1, wherein the first state is a foreground application state and the second state is a background application state.

3. The medium as in claim 1 wherein the first application program is one of a plurality of application programs that are executing and consuming memory.

4. The medium as in claim 3 wherein the time period gives the first application program time to reduce memory consumption before the second memory consumption amount is applied to the first application program.

5. The medium as in claim 3 wherein the plurality of application programs receives the memory pressure notification.

6. The medium as in claim 5 wherein the method further comprises:
   terminating the first application program, after changing the memory consumption amount of the first application program, when the memory consumption of the first application program exceeds the second memory consumption amount.

7. The medium as in claim 5 wherein the method further comprises:
   applying a hierarchy of memory management processes to reduce memory pressure when available memory is low.

8. The medium as in claim 7 wherein the hierarchy of memory management processes comprises one or more of:
   sending memory pressure notifications that request desired levels of memory usage reduction;
   purging volatile memory that is marked as purgeable;
   paging out memory pages from volatile memory to non-volatile memory;
   terminating suspended applications; and
   terminating background applications that are not suspended.

9. The medium as in claim 8 wherein each application program in the plurality of application programs has a priority level that is used by the memory management processes to reduce memory pressure when available memory is low.

10. A method comprising:
    transitioning a first application program from a first state to a second state, wherein the first state has a first memory consumption amount and the second state has a second memory consumption amount that is less than the first memory consumption amount;
    sending, after the transitioning, a memory pressure notification to the first application program;
    waiting a time period after sending the memory pressure notification, wherein during the time period, the second memory consumption amount is not applied to the first application program; and
    dynamically changing the first memory consumption amount of the first application program to the second memory consumption amount.

11. The method as in claim 10 wherein the first state is a foreground application state and the second state is a background application state.

12. The method as in claim 10 wherein the first application program is one of a plurality of application programs that are executing and consuming memory.

13. The method as in claim 12 wherein the time period gives the first application program time to reduce memory consumption before the second memory consumption amount is applied to the first application program.

14. The method as in claim 12 wherein the plurality of application programs receives the memory pressure notification.

15. The method as in claim 14 further comprising:
    terminating the first application program, after changing the memory consumption amount of the first application program, when the memory consumption of the first application program exceeds the second memory consumption amount.

16. The method as in claim 14 further comprising:
    applying a hierarchy of memory management processes to reduce memory pressure when available memory is low.

17. The method as in claim 16 wherein the hierarchy of memory management processes comprises one or more of:
    sending memory pressure notifications that request desired levels of memory usage reduction;
    purging volatile memory that is marked as purgeable;
    paging out memory pages from volatile memory to non-volatile memory;
    terminating suspended applications; and
    terminating background applications that are not suspended.

18. The method as in claim 17 wherein each application program in the plurality of application programs has a priority level that is used by the memory management processes to reduce memory pressure when available memory is low.

* * * * *